United States Patent
Goodwin et al.

[19]

[11] Patent Number: 6,125,429
[45] Date of Patent: Sep. 26, 2000

[54] CACHE MEMORY EXCHANGE OPTIMIZED MEMORY ORGANIZATION FOR A COMPUTER SYSTEM

[75] Inventors: Paul M. Goodwin, Littleton; Stephen Van Doren, Northborough, both of Mass.

[73] Assignee: Compaq Computer Corporation, Houston, Tex.

[21] Appl. No.: 09/041,513

[22] Filed: Mar. 12, 1998

[51] Int. Cl.[7] .................................................. G06F 12/08
[52] U.S. Cl. .......................... 711/143; 711/121; 711/133; 711/148; 711/153; 710/132
[58] Field of Search ..................... 711/133, 157, 711/143, 144, 148, 149, 150, 151, 153, 158, 159, 168, 169, 202, 5, 121; 365/230.03; 710/132

[56] References Cited

U.S. PATENT DOCUMENTS

| | | | |
|---|---|---|---|
| 5,202,970 | 4/1993 | Schiffleger | 711/151 |
| 5,559,970 | 9/1996 | Sharma | 710/132 |
| 5,577,204 | 11/1996 | Brewer et al. | 710/132 |
| 5,581,729 | 12/1996 | Nishtala et al. | 711/143 |
| 5,701,413 | 12/1997 | Zulian et al. | 709/214 |
| 5,761,695 | 6/1998 | Maeda et al. | 711/157 |
| 5,859,975 | 1/1999 | Brewer et al. | 395/200.43 |

*Primary Examiner*—Hiep T. Nguyen
*Attorney, Agent, or Firm*—Hamilton, Brook, Smith & Reynolds, P.C.

[57] ABSTRACT

Data coherency in a multiprocessor system is improved and data latency minimized through the use of data mapping "fill" requests from any one of the multiprocessor CPUs such that the information requested is acquired through the crossbar switch from the same memory module to which the "victim" data in that CPUs cache must be rewritten. With such an arrangement rewrite latency periods for victim data within the crossbar switch is minimized and the 'ships crossing in the night' problem is avoided.

7 Claims, 6 Drawing Sheets

| FIG. 2A | FIG. 2B | FIG. 2C |

CACHE MEMORY EXCHANGE OPTIMIZED MEMORY ORGANIZATION FOR A COMPUTER SYSTEM

BACKGROUND OF THE INVENTION

This invention relates generally to computing systems with multiple shared memory resources and more particularly, to methods for increasing the exchange rate between main memories and cache memories in multiple central process unit (CPU) computing systems.

As is known in the art, complex computing systems, in particular systems which have multiple CPUs, may have some of what is known as "dirty" cache entries. A cache entry, or piece of data, is known as a "dirty" entry if it has been modified since the time it was fetched from the main memory to the cache. This means that the "dirty" cache entry has a different value from the original data fetched from the main memory, due to an action in the CPU, typically an arithmetic operation. Thus the information in the cache memory has been modified by some step in the computation process and the original data entry in the main memory is no longer compatible with the newly calculated value for this particular piece of data in the cache, i.e., what is known as a "dirty" cache value. By contrast, a "clean" cache value is a memory value that has not been modified by the CPU, typically an instruction or a reference data value. Thus, the original data value in the main memory needs to be updated to equal the modified or "dirty" cache entry. This is typically done by a "write-back" command, also known as "retiring the victim". In a "write-back", the modified or "dirty" cache entry is written back into the main memory location from which it was initially fetched, thus updating the data value. After the "dirty" cache entry has been rewritten back into the main memory, (i.e., the main memory location for that particular value has been updated to the new value) the memory is said to be "coherent" (i.e., there are not multiple versions of the same data value in the computer system), and the computer system memory is said to be maintaining its "coherency".

During the time period in which this "dirty" cache entry value is waiting to be written back to the main memory it is necessary to prevent the CPU from "writing over" the "dirty" cache entry with a different piece of information from a different location in the main memory. Such a different piece of data may be required to continue the progress of the program being run by the CPU. For example, if a new piece of information is fetched from some portion of the main memory and placed into the particular cache memory entry location that currently has the "dirty" information, this is known as being "run over" by an "impending fill". Note that the "run over" "dirty" data can no longer be used to properly update the main memory. A CPU cache block that is displaced or "run over" by an "impending fill" is known as a "victim". Another way of looking at this is to note that the "impending fill" is the new data that will be stored at the cache memory location, and the "victim" is the old data that was previously stored at the cache location, and needs to be rewritten into the main memory location from which it was originally fetched in order to keep the data in the memory up to date.

As is known in the art, any potential "victim" may be exchanged with the "impending fill" data on the bus system, with the "victim" data then directed back to the original portion of the main memory from which it was initially fetched, thus rewriting the corrected data back into the original main memory location. This system of exchanging data works well in computing systems using bus lines to connect the CPU or CPUs to the main memory or memory modules.

A problem with exchanging data in computing systems that use bus lines is that the period of time required to wait for the main memory (generally composed of Dynamic Random Access Memories (i.e., DRAMs)) to access the correct memory location and to ship the exchanged information on the bus, known as the "latency" period, reduces the operational speed of the system. Thus, the sequence of events on a typical bus system might be:

1. The exchange command, possessing the address of the "fill" data in the main memory and the address of the "victim" cache data which will be run over, is sent out over the bus line;

2. The "victim", i.e., the "dirty" data, and its address, show up on the bus, which then writes the main portion of the exchange transfer back into the memory address;

3. The main memory provides the new "fill" data.

The above sequence of events slows down the overall functional speed of the system. In other words the "latency" period is increased. This situation of high exchange "latency" cannot be avoided, because as noted above, it is important to maintain "data coherency", i.e., not have multiple versions of the "same" data value in a computer.

The above-mentioned situation with system coherency becomes even more serious, as compared to the bus type system discussed above, in what is known as a "crossbar switch" type system. A "crossbar switch" is a circuit which connects any of a series of CPUs or other data users (known as commanders) to any of a series of memory resources in an arbitrary fashion or in a fashion dictated by the program. Any one of the data users can attach at any time to any one of the memory resources. This type of arrangement is faster than the bus system used in the prior art, because each CPU and each memory has what is known as a "hard link" with each of the other units. Data values are not simply dumped onto a bus with hopes that they arrive at the desired location without a collision with another data value from another one of the CPUs. Rather, the commander is connected directly to the specific memory resource containing the data value needed and no onther commander may have access to that memory resource during the time of interconnection. This is results in what is known as having a wider data transmission bandwidth. With a crossbar switch, the data transmission bandwidth may be the sum of all the individual parts. In other words, in a four processor computer system, a crossbar switch may be four times faster than the individual serial-port bandwidth of an equivalent bus. All four CPUs my be connected to a different one of the memory resources at the same time.

A problem with a bus type computing system, as noted above, is that two or more memory data user elements (commanders), or memory resource elements may be trying to "write" data onto the same bus at the same time. This results in what are known as "contentions" or "collisions" between the multiple commanders and memory units, as each of these users and memories compete for access to what is in essence a single communication resource. The need to detect "collisions", and to use an arbiter chip to resolve the "collisions" and "contentions", contributes to the lack of speed in bus systems, particularly bus systems that have large numbers of commanders (or data users) and bystanders (or data resources) connected to them. Typically, arbitors resolve collisions by notifying each of the two contending commanders or bystanders that there was a "collision", i.e., that the data did not get to its intended location, and ordering each of the contenders to step back and wait for a random period of time before attempting to access the bus again. Clearly, time is lost when the data does not get to its intended destination, and the random waiting period required to decrease the probability of another collision between the same two contenders also represents lost time.

Another way of looking at this problem is to say that a bus type system is limited to some maximum serial bandwidth, whereas, a crossbar switch has the ability to move data in a parallel fashion and thus is the sum of the parts of all of the multiple data paths of the individual serial port bandwidths.

For example, in a computer system having four CPUs, or commanders, four main memory modules, and a crossbar switch, there would exist only a one-in-four chance that the cache "victim" data's original memory address and the new "fill" data's memory address happen to be from the same main memory module. Recalling that with a crossbar switch one specific CPU is hardwired to the specific memory module from which it was receiving data, then the problem is clear that the "fill" data (i.e., the new data coming in from the main memory and likely to run over the "dirty" cache data) is likely (i.e., 75%) to be from a different physical memory module than the "dirty" data was from. Thus, since the crossbar switch has now attached a specific CPU to a specific memory module that is likely do not be the memory module from which the "victim" data came, then there exists a problem in writing the "victim" data back to the correct memory location, and a memory-coherency problem may result. Therefore in a typical crossbar switch system, there must be some possibility of a delay in the "fill" command until the potential "victim" data can be written to the main memory.

Another known problem with a crossbar switch type of computing system is that the main memory module to which the "dirty" data or "victim" data is to be rewritten may be in the process of being accessed at that same time by another CPU, and thus the memory access port will be busy with other "fills" to other CPUs. In this case the possibility exists that the "victim" data may remain buffered in the crossbar switch until such time as the memory module port to which the "victim" memory is addressed is no longer busy.

The two above enumerated crossbar switch problems may lead to catastrophic data coherency problems. If another CPU accesses the outmoded (i.e., incoherent) data from the memory BEFORE the rewrite of the "victim" data can occur then the CPU receives "stale" data. This results in incorrect data being used, or even system crashes. Improperly updated data being used by another portion of a multiple CPU system due to long "latency" period for rewriting "victim" data into the main memory resource is a major performance and reliability problem for multiple processor computer systems.

SUMMARY OF THE INVENTION

In accordance with the invention, a computing system includes multiple central processing units (CPUs) and multiple memory resources connected by a crossbar switch wherein the interleaving bits and the row address in the main memory address of the "victim" data and the "fill" data are common to one another. This is accomplished by mapping data bits such that the "index" portion of the data match, thus assuring that any new "fill" to a particular CPU cache location goes to a cache element having data from the same memory resource as the new "fill" data. Performing this mapping operation guarantees that both the "fill" data and the "victim" data are from the same memory module and thus, there is no "latency" between the "fill" command and the "writeback" command for the "victim" data since the "fill" command establishes a hardwire connection between the CPU and the memory module. Thus the "victim" rewrite command requires no extra delay waiting for a connection to the correct main memory element, and improved data coherency and transmission bandwidth result.

BRIEF DESCRIPTION OF THE DRAWINGS

The foregoing features of this invention, as well as the invention itself, may be more fully understood from the detailed description read together with the accompanying drawings, in which.

DESCRIPTION OF THE PREFERRED EMBODIMENT

Figure 1:
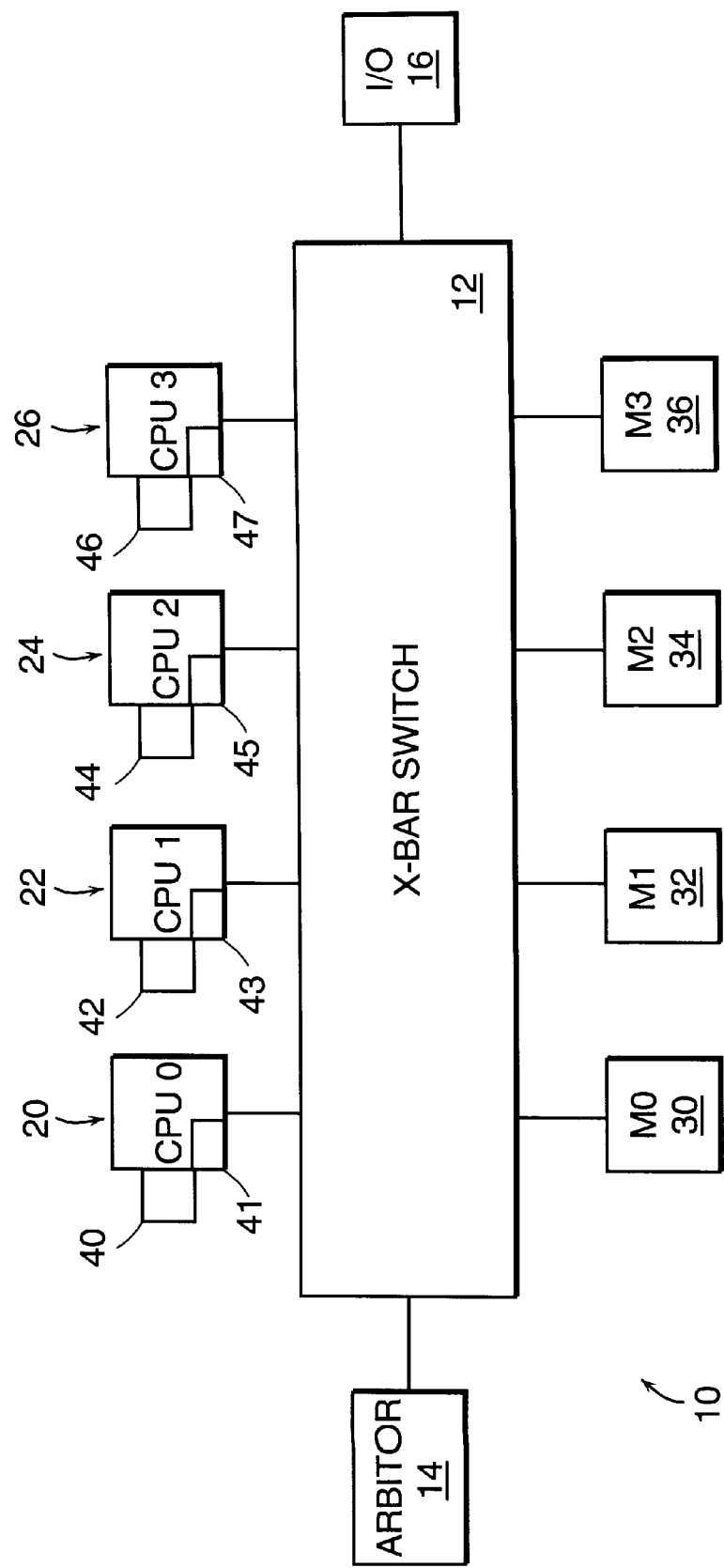
FIG. 1 is a block diagram showing a multiprocessor/multimemory system.

Referring now to FIG. 1, a computer system 10 is shown having a crossbar switch 12 connected to an arbiter chip 14, an input-output device 16, a number of central processing units (CPUs), in this illustrative embodiment numbered 20, 22, 24, 26, and a number of memory modules, numbered 30, 32, 34 and 36. Each of the CPUs, 20–26 will have what is known as a "cache" memory, 40, 42, 44 and 46 respectively, and cache controllers 41, 43, 45 and 47 respectively. Each of the CPUs, 20–26 will take data from a selected one of the four shown memory modules, 30–36.

The selection of the memory module chosen for the transfer of data to the CPU cache is based on which particular piece of information is needed by the computer program at the particular juncture in the calculation. The CPU (which is a user of memory resources, commonly known as a "commander") issues a command to have the data from the specified memory module transferred to the cache memory in the CPU. At any given time all of the CPUs 20–26 may be simultaneously seeking information, and the arbiter chip 14 will decide which of the CPU requests has priority and make the connections between that CPU and the memory resource desired by the CPU.

With a crossbar switch such as 12, each of the four CPUs 20–26 could be connected to one of the four memory modules 30–36, thereby connecting all four CPUs to a separate one of the four memory modules 30–36. A crossbar type system may have all four CPUs 20–26 reading data, and all four memory modules 30–36 may be providing data at the same time, versus only one at a time with a bus type system. Thus a crossbar switch provides parallelism to the exchange of memory data between the main memory and the cache memories in the CPUs, thereby increasing the throughput of the computing system. If two different CPUs wanted to access data that happened to be in the same memory module, arbiter chip 14 would decide which of the CPUs could have access to that memory at that particular time. The nonselected CPU would have to wait until the first CPU finished, for its memory connection and "fill" of data to occur.

When a particular CPU, for example 20, fetches data from a memory, for example memory module 30, and stores it in cache, there's a high likelihood that the data will be modified by the program. If the data in the CPU cache memory is unmodified since the time it was written from the main memory into the cache, it is called "clean" or unmodified. Typical examples of "clean" or unmodified cache entries would be instructions or reference data. Most likely, however, the information is a current value of some specific variable in the program, which the CPU calls from the memory because the program requires an operation to be performed on this data value. Once the operation is performed and the data value is changed, this piece of information is now referred to as a "dirty" cache entry. The reason that it is referred to as "dirty" is that the cache data, the value of the variable, is now different from the value of that same variable stored in the main memory. This is an issue of system coherency.

At this point, the computing system needs to immediately "writeback" to the main memory the new and currently valid memory. This "writeback" operation is also known as "retiring the victim". The "dirty" data in the CPU cache memory is known as the "victim" because generally the next operation in the progression of the programming code is likely to take a new piece of data from one of the memory resources and write it over (i.e., fill) that portion of the cache containing the "dirty" information. Thus, the modified or "dirty" information which has not yet been written back to the main memory will be run over, written over, or "victimized" by the new "fill" command. Since the rapid operation of a computing system such as that shown in FIG. 1 depends on the CPU cache being available for the next "fill" of information for the next step in the operation, it is important for the "dirty" data to be retired as soon as possible and written back into the original memory location so that the main memory has the most up-to-date data. Thus system coherency is maintained.

There exists a need for a more efficient method of exchange memory operations, i.e., exchange the "dirty" information in the CPU cache with the outdated, outmoded information in the main memory, without interfering or delaying the next "fill" operation in the cache. This situation is more complex when there are multiple CPUs 20–26 (such as those shown in FIG. 1) utilizing multiple memory elements 30–36, because different ones of the CPUs may be looking for the same data value for operations that are occurring in parallel in the CPUs 20–26. For example, CPU 22, in FIG. 1 may be interested in exactly the same address in memory 30, as CPU 20 may be currently using. This is perfectly acceptable if CPU 20 has already had an opportunity to rewrite the modified information (i.e., "dirty") from CPU 20 back into its appropriate location in memory 30. If CPU 20 attempts to write the "dirty" information into memory 30 to maintain coherency, but is unable to do so immediately because some other CPU, for example CPU 26, has already made a connection to the same memory module, then CPU 20 cannot make the connection to the memory to perform the rewrite. Thus the "victim" information from the cache must wait for CPU 26 to finish using the memory 30, so that CPU 20 can rewrite the data, and recover data coherency.

The above noted delay problem is aggravated when the other CPU accessing the memory is attempting to read the same, currently unrevised, data element that has already been modified by the program in CPU 20. Thus, in our example, CPU 26 would fetch a presently incorrect data value and may result in a system failure.

Such a CPU cache "victim" might remain in transit in the crossbar switch for a prolonged period of time during which one or more of the other CPUs may also attempt to access the same piece of information, possibly resulting in a catastrophic failure of the system.

The present invention provides a solution to the above noted problem of somehow insuring that the "victim" data from one CPU is rewritten into its appropriate space in the memory before another CPU moves to access or create a "fill" command for the same data, by insuring that all CPU calls for a new "fill", comes from the exact same memory module as the "victim" data in the CPU cache had come from originally. By ensuring that the "fill" into the CPU cache comes from the same memory module as the "victim" data, there is total assurance that the connection created by the crossbar switch 12 in FIG. 1 between, for example, CPU 20 and memory 30, is guaranteed to be immediately available for the "victim" data rewrite. There is further assurance through maintaining this hard link between CPU and memory that none of the other CPUs can access that memory to read to currently incoherent data. This is a problem with existing multi computer systems known as "ships crossing in the night".

The described arrangement ensures that the CPU "fill" data is from the same memory module as the current occupant of the cache, i.e., the "victim" data, which needs to be written back to the memory module to ensure data coherency. This is accomplished by using the index portion of the physical memory address to determine which portion of the CPU cache memory will be used to store the data, such that the desired information from the memory module has the same index value as the cache memory "victim". Thus the information is transferred to a cache memory location where the hard connection for the "victim" rewrite already exists. This is a process referred to as mapping.

Figures 2, 2A:
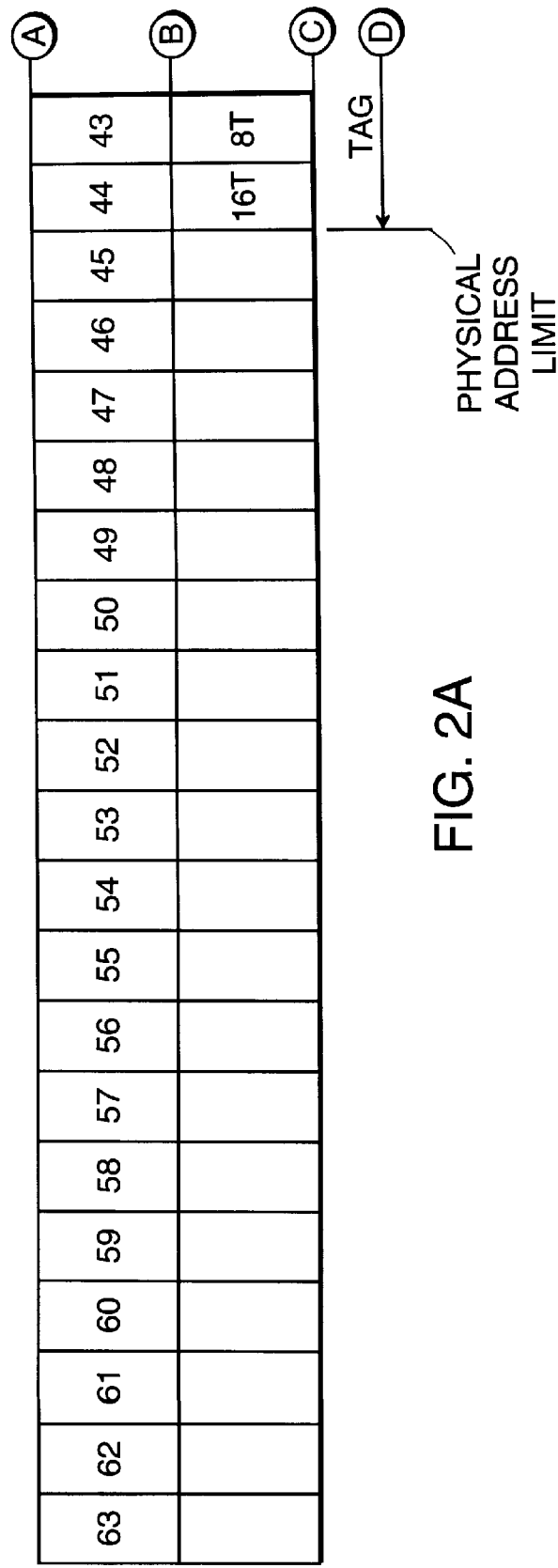
FIG. 2 is a map of a memory word showing a partitioning of the bits in accordance with the present invention.
Figure 2B:
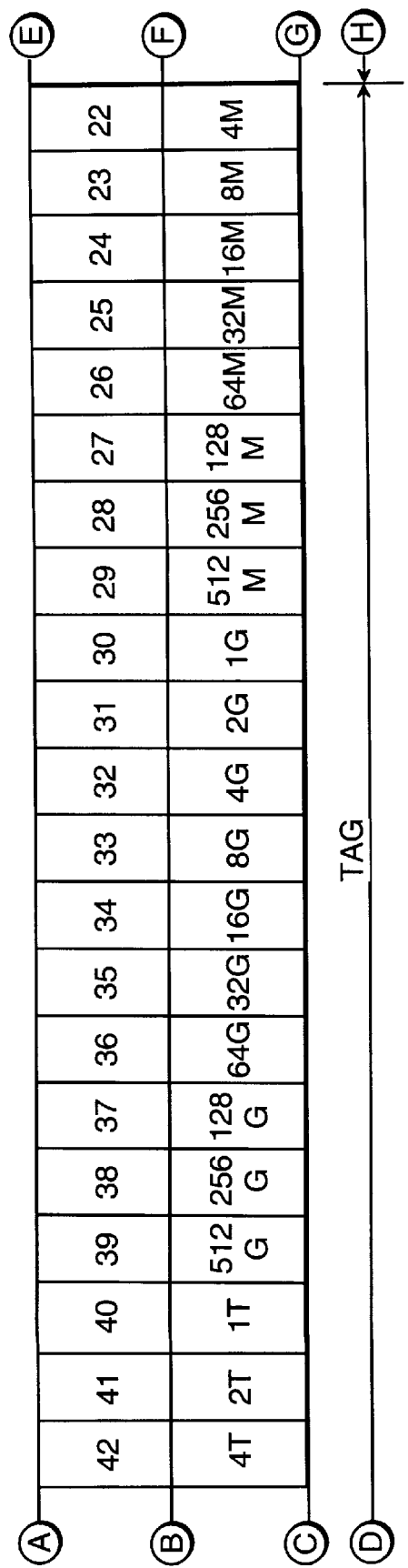
Figure 2C:
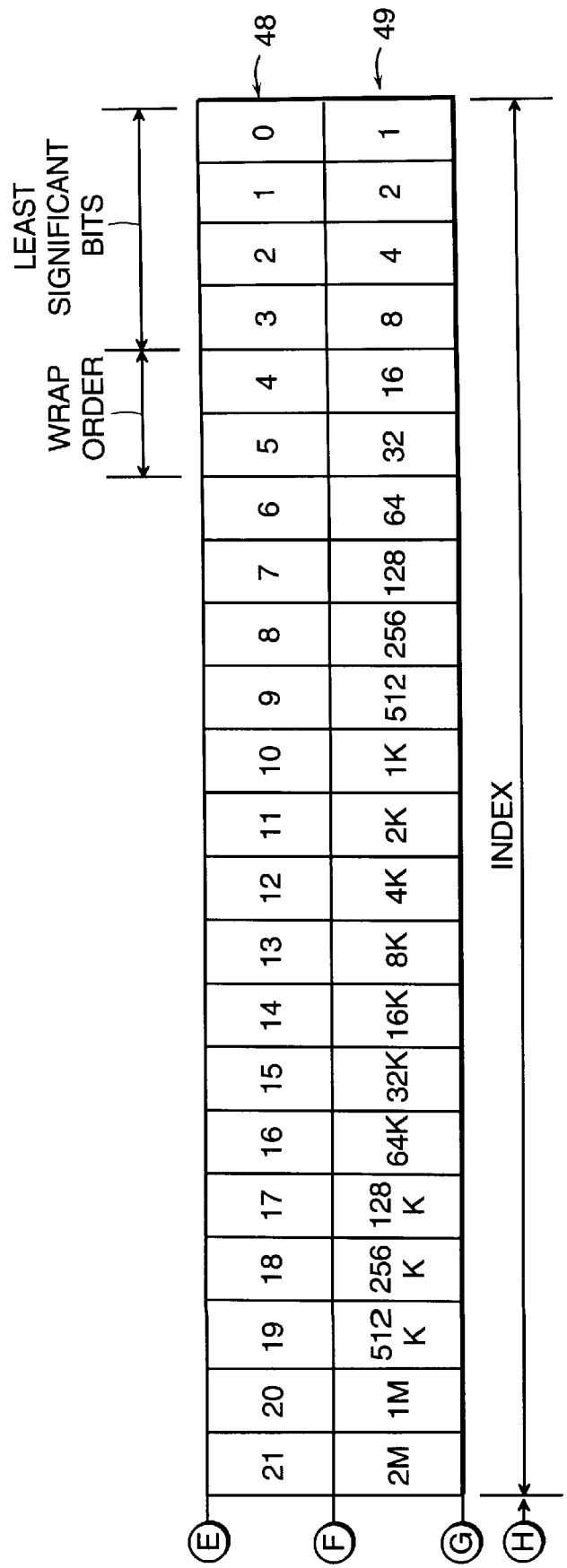

Referring now to FIG. 2, the 64 bits of an exemplary instruction word are shown numerated in the column labeled "48" as bits "0 thru 63". The row labeled "49" indicates the decimal value of the specific bit to which it is attached. For example, the exemplary bit labeled 20 in row 48 has a decimal value, as indicated in row 49 of 1 million. In this example, the least significant bits are indicated on the right side as bits 0 thru 3, and the most significant bit is bit number 63.

Figure 4:
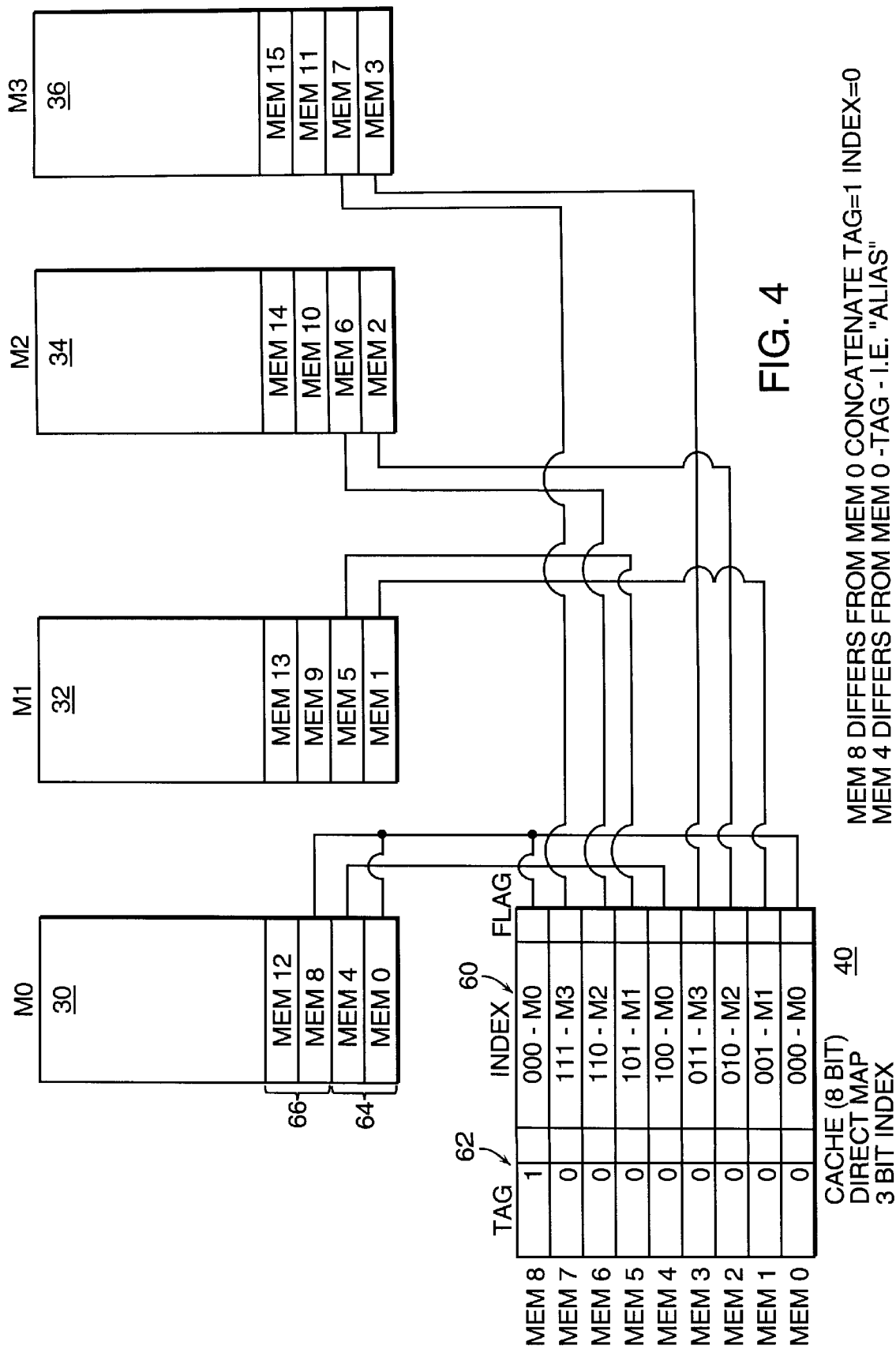
FIG. 4 is a map of a representative interleaved memory system.

The six least significant bits in column 48, (i.e., 0 thru 5) are known as the "interleave" bits. Interleaving is a procedure well-known within the art which provides effective increased memory access speed by allowing staggered access to the physical locations of a specific piece of data to be partitioned or interleaved in a number of different physical memory elements. An example of interleaving is shown in FIG. 4 and the accompanying discussion. Interleaving does not in itself increase memory access speed. A problem with dynamic random access memories (i.e., DRAMs, SDRAMs, or VDRAMs) is that the actual physical memory storage element is a capacitor. The read operation then depletes the charge of the capacitor. Thus in a read or write transaction, the memory may read a row of memory elements (i.e., a page) from the array of memory elements. The page that has been read now needs to be rewritten to recharge the capacitors in an operation known as a "precharge". This precharge must be completed before the next read command is received for the page. Interleaving staggers accesses to memories that are on the same bus line so that one page is being recharged while another page is being read. For more on interleaving, see the discussion of FIG. 4 following. Thus interleaving effectively increases the overall memory access speed by eliminating the need to delay the next read until the precharge is complete. In order for the memory access order to be maintained, it is necessary to know in what order to put these physical elements together and hence, you need to have a wrap order designated, which is the function of the interleaving bits numbered 4 and 5.

In a memory system that does not access a single bit of data at a time (known as a bit slice) but rather reads the data in blocks (i.e., words) of 64 bits each, the bits numbered 0–5 are not used because they are addressing the first bits of the word. In such an exemplary system the bits numbered 6–7 would determine which of the memory modules 30–36 of FIG. 1 are addressed. The rest of the index, numbered 8–21, give the specific address in the cache memory. Since the general case is that there are more main memory locations (i.e., in memory modules 30–36 of FIG. 1) that there are in the cache memory in CPUs 20–26 of FIG. 1, the portion of the physical address known as "tag" bits, numbered 22–44, when concatenated with the index bits, provide the ability to map the cache memory into the entire main memory. See FIG. 4 for an example of this mapping.

Figure 3:
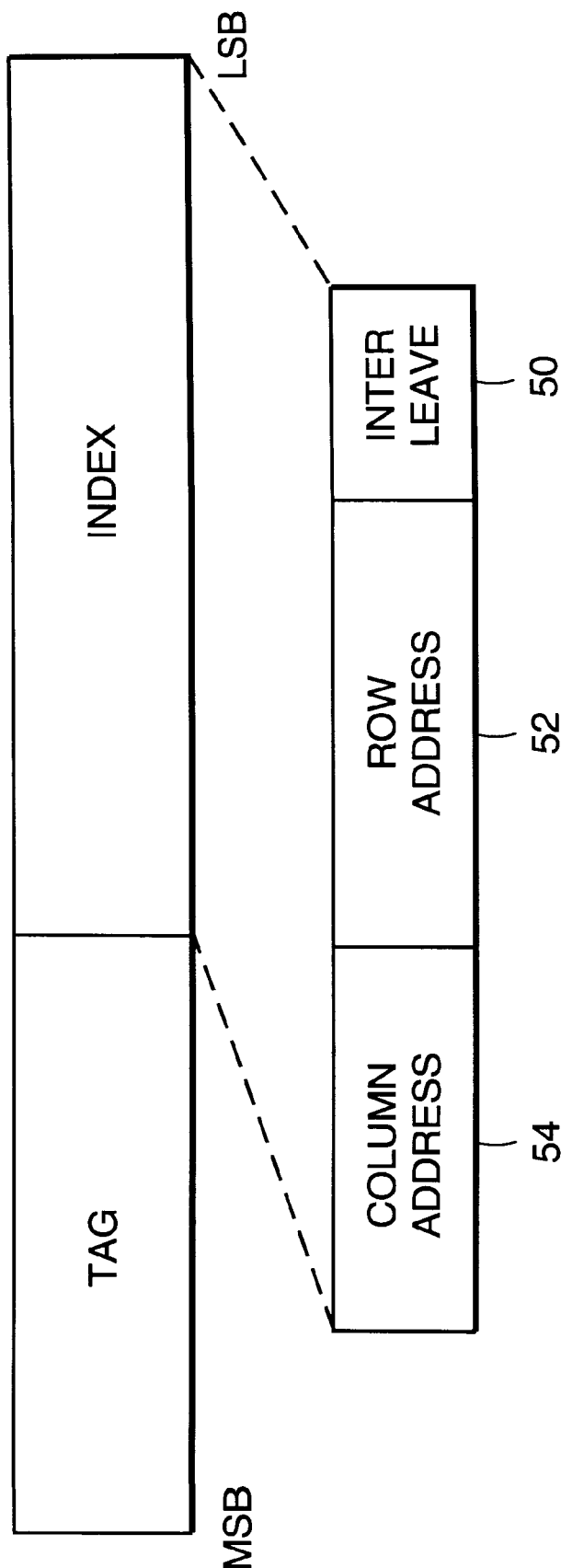
FIG. 3 is an enlargement of one section of the bit address map of FIG. 2 showing how the index is further subdivided in accordance with the present invention.

Referring now to FIG. 3, the portion of FIG. 2 from column 48, bit 0 thru bit 44 (the sections known as the tag and index) are expanded showing that within the index, the least significant bits are (as previously mentioned with regard to FIG. 2) the interleave bits 50. The next group of bits is the "row" address 52, and the most significant portion of the index is the "column" part of the address 54. The mapping of the interleave and row addresses referred to above in the discussion of FIG. 2, is herein shown to stay within the least significant bits because it is specifically the row address of the main memory element which is mapped.

Thus, for what is known as a direct map cache memory, the tag portion of the physical address space, when concatenated with the index, gives the location of the data in the overall main memory (i.e., 30–36); the index portion gives the location of the data in the CPU cache memory; and the bits 6 and 7 tell which of the four main memories 30–36 the data is from, and also where the changed (i.e., dirty) data must be rewritten to. Typical memories, 30–36, map the column address 54 to the upper order address bits and the row address 52 to the lower order bits.

The present arrangement maps the interleaved bits plus the row addresses 52 of the main memory 30–36 of the "fill" address to be the same as the same interleave bits and row address of the "victim" data already in the CPU cache memory 20–26. This mapping is done within a section of the first 21 bits (i.e., the index) of the 64-bit word. Swapping the higher order address bit (i.e., the tag) with the lower order index bits results in automatic return of "victim" data to the same memory module 30–36 that the new "fill" data came from, and the same memory module 30–36 that the "victim" originally came from. Thus, by use of the mapping, it can be assured that the "fill" data and the original address of the "victim" data in the CPU come from the same memory module.

Since the interleave and index portions of the memory are made to be the same between the "victim" and the "fill", then only a single resource is allocated by the crossbar switch and the arbiter chip 14. The "victim" data has an assured direct line to the necessary memory resource and less time is consumed in the rewrite operation. Thus use of the present invention assures data coherency in a multi-CPU system and minimizes the latency of the rewrite command for "victim" data.

Referring now to FIG. 4, a simplified 3 bit index example of an interleaving memory system is shown to distribute data from a cache memory, in this illustrative example, cache 40 of CPU 20, into main memory modules 30–36, from FIG. 1. In this illustrative example the index portion of the physical address is limited to three bits and the tag portion is a single bit. The cache shown contains eight bits of data. The principle of memory interleaving is shown by having the sequential bits of data in cache 40 each coming from different members of the main memories 30–36, thus allowing each of the main memories 30–36 to recharge while the next piece of data is being fetched from another memory. In the general case the interleaving is not done between different physical memory modules, but is rather between different rows or columns within a memory chip, but the principle is the same. Note that it can be easily determined exactly which memory module 30–36 the data will be stored at by simply looking at the third column, labeled 60, of the address.

The principle of concatenation previously discussed is shown by the use of the tag bit labeled 62. By using the bit 62 with the index bits, the portion of the main memory 30, in which it is desired to store a piece of data from cache 40 may be ascertained. In this illustrative embodiment the bit 62 determines whether the pieces of data having addresses with two tailing zeros go into region 64 or region 66. The same is clearly true of any portion of the main memory modules 30–36.

Thus if cache 40 had a crossbar switch connection with main memory 30 and wanted a piece of data from region 66, then in order to completely avoid memory latency problems it is only necessary, in this illustrative embodiment, to look for a location in cache 40 which contains a "victim" data element having the same value for the first two bits of the physical address, in this example "00".

Therefore, the problem of data coherency and rewrite latency period in a multiprocessor computer system using a crossbar switch can be improved by use of a mapping method for impending fill data which efficiently maps the fill data to a cache memory location with victim data from the same memory module.

Having described a preferred embodiment of the invention, it will now be apparent to one of skill in the art that other embodiments incorporating its concept may be used. It is felt, therefore, that this invention should not be limited to the disclosed embodiment, but rather should be limited only by the spirit and scope of the appended claims.

What is claimed is:

1. A computing system, comprising:

a main memory having multiple segments;

a plurality of central processing units each including a respective cache memory having plural memory locations, one of the cache memories having at least one memory location storing data to be rewritten into a certain segment of the main memory;

a crossbar switch coupled between the central processing units and the main memory, for connecting selected memory locations of respective cache memories to selected segments of the main memory;

one of said central processing units, having the one cache memory, issuing data read request to read data from main memory at the certain segment; and a cache controller, responsive to the read request, for mapping the one memory location of said one cache memory to the certain segment of said main memory such that the crossbar switch connects together the one cache memory and the certain segment of main memory and thereby (i) prevents other central processing units from accessing said certain segment of main memory during the data read and (ii) provides immediate availability for a data rewrite of the data stored in said one cache memory location.

2. The system of claim 1 wherein said respective cache memory is further a direct mapped cache.

3. The system of claim 1 wherein said central processing unit issues a rewrite request to write said one cache memory stored data back to said certain segment of the main memory in response to a pending victim status of said data.

4. A computing system, comprising:

a plurality of central processing units, each of said central processing units having a cache memory, and being connectable to a plurality of memory modules by a crossbar switch;

said plurality of central processing units issuing data read requests for data stored in said plurality of memory modules;

said plurality of central processing units issuing rewrite requests to write data from respective cache memories back to said plurality of memory modules;

wherein one of said central processing units having a cache memory with one cache memory location storing data to be rewritten into a certain memory module issues a data read request by mapping the certain memory module to the one cache memory location for the data read, such that the crossbar switch connects together the certain memory module and the cache memory of the central processing unit in a manner that (i) prevents other central processing units from accessing the certain memory module and (ii) provides immediate availability for a data rewrite by the central processing unit, to write the data stored in the one cache memory location to the certain memory module.

5. The system of claim 4 wherein said cache memory of each central processing unit comprises a direct mapped cache.

6. The system of claim 4 wherein said central processing unit issues a rewrite request to write the cache memory stored data back to said certain memory module in response to a pending victim status of said stored data.

7. A method of computing using a plurality of central processing units containing direct mapped cache memory elements, connected to a plurality of memory modules by a crossbar switch, comprising the steps of:

(A) issuing data read requests from said plurality of central processing units for data stored in said plurality of memory modules, including for each data read request by a central processing unit having a cache memory element storing data originally from a certain memory module, (i) mapping the certain memory module to the cache memory element for the data read, and (ii) using the crossbar switch, forming a connection between the certain memory module to the central processing unit; and (B) issuing rewrite requests from said plurality of central processing units to write victim data stored in cache memory back to said plurality of memory modules, wherein rewrite requests by the central processing unit of step (A) use the formed connection for rewriting said stored data from the cache memory element to said certain memory module.

* * * * *